J. ECKERT.
CAR BRAKE HANDLE.
APPLICATION FILED APR. 9, 1918.
1,276,337.
Patented Aug. 20, 1918.
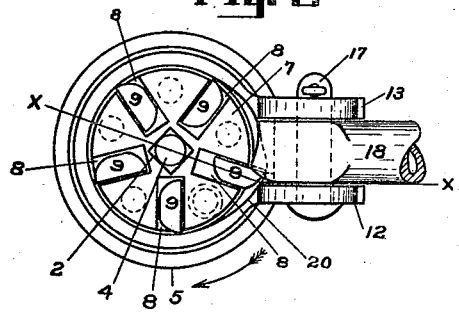
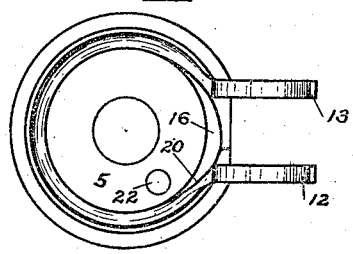
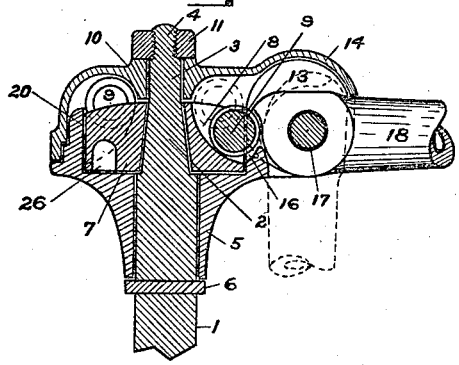
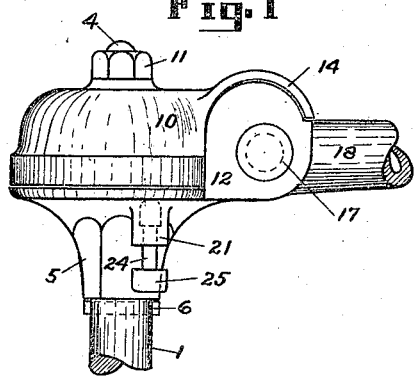
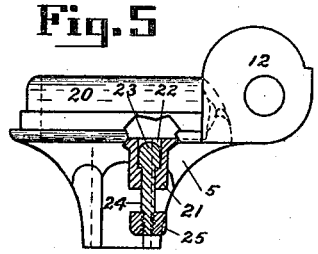
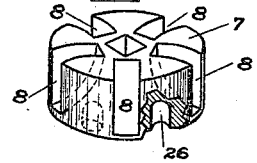
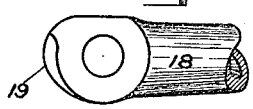
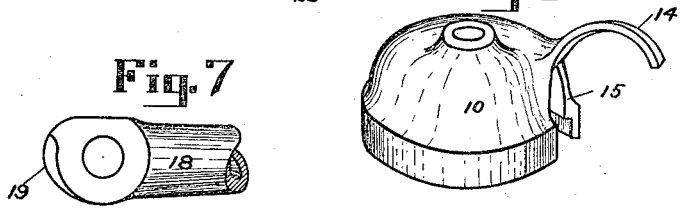
Attest.
Geo. W. Shultz.
John K. Matthews.
Inventor.
Joseph Eckert
By Kirby
his atty.

UNITED STATES PATENT OFFICE.

JOSEPH ECKERT, OF DAYTON, OHIO, ASSIGNOR TO THE DAYTON MANUFACTURING COMPANY, OF DAYTON, OHIO, A CORPORATION OF OHIO.

CAR-BRAKE HANDLE.

1,276,337.  Specification of Letters Patent.  Patented Aug. 20, 1918.

Application filed April 9, 1918. Serial No. 227,456.

*To all whom it may concern:*

Be it known that I, JOSEPH ECKERT, a citizen of the United States, and resident of Dayton, in the county of Montgomery and State of Ohio, have invented certain new and useful Improvements in Car-Brake Handles, of which the following is a description, reference being had to the accompanying drawings, which form a part of my specification.

My invention relates to an improvement in car brake handles, and more particularly to that class wherein the handle or operating lever when turned in one direction rotates the brake shaft, and when turned in an opposite direction will move independently of the brake shaft. The invention further relates to brake operating mechanism wherein the normal or inoperative position of the operating lever is substantially parallel with the brake shaft and wherein the operative position of said lever is at right angles to the shaft.

The object of my invention is to produce a brake operating device having a pivoted operating lever and embodying the principle disclosed in United States Letters Patent No. 508,025, issued to J. Kirby, Jr., Nov. 7, 1893, and to utilize said principle in such manner as will permit the brake shaft to rotate in a reverse or unwinding direction, when the brakes are released, independently of the operating lever and the casing, which object I accomplish by means of a roller carrier containing a series of rollers within the casing and which rollers co-act with a shoulder formed on the operating lever, as contradistinguished from certain mechanism shown and described in the application of myself and John Kirby, Jr., Serial Number 202,982, filed in the United States Patent Office Nov. 20, 1917.

With the aforesaid and other objects in view the invention consists in the various novel details of construction and combination of parts hereinafter fully described in the specification, illustrated in the drawings and more particularly pointed out in the claims.

In the accompanying drawings forming part of the specification, and in which like reference characters indicate corresponding parts, I have illustrated one form of brake handle embodying the essential features of my invention, although the same may be carried into effect in other ways without in the least departing from the spirit thereof. In the said drawings Figure 1 is a side view of the assembled device; Fig. 2 is a vertical section of the device taken through the line XX of Fig. 3; Fig. 3 is a top plan view with the top part of the casing removed; Fig. 4 is a broken perspective view of the roller carrier, removed from the casing; Fig. 5 is a broken side view of the body piece showing the locking device in section; Fig. 6 is a top plan view of the body piece; Fig. 7 is a side view of the connecting end of the operating lever, and Fig. 8 is a perspective view of the top casing.

Referring to the drawings 1 represents the brake shaft, which is preferably round in form, the lower portion of which is mounted, in the usual manner, in the car platform.
Near the upper end of the shaft there is a square and tapered portion 2 formed thereon, above which is a round portion 3 having a reduced threaded end 4. A body piece 5 is rotatably mounted on the shaft and held in proper elevation thereon by a pin 6. A roller carrier 7 is mounted on the squared portion 2 of the shaft and rotates therewith. It is provided with a plurality of inclined channels 8 intended to receive loose rollers 9, any suitable number of which may be employed. On the round portion 3 of the shaft there is mounted a top casing 10 which rotates around the shaft in unison with the body piece 5 and which in conjunction with the latter forms a casing for the roller carrier 7 and rollers 9, and which is held in position by a nut 11. At one side of and preferably integral with the body piece 5 there is formed a pair of laterally extending ears 12, 13, spaced apart as shown in Fig. 3 and covered by a hood 14 extending from the top casing 10, the wall of the latter being cut away at 15 to straddle the said ears. The wall of the body piece 5 is cut away and recessed at 16 to permit the rollers, one after another as they come opposite this point, to travel down their respective inclines a suitable distance beyond the outer face of the roller carrier to be engaged by the operating lever in a manner and for a purpose presently to be explained, it being understood that movement of the rollers is confined to a vertical plane and that when out of such engaging position they occupy an elevated position in their respective chambers within the confines of the wall of the body piece 5, as more clearly shown in Fig. 2. Between the ears 12, 13 there is mounted, on a pivot 17, an operating lever 18, which may be any desired length and form, and which, in the preferred embodiment of my invention, when in its normal or inoperative position, hangs substantially parallel with the brake shaft, as shown by dotted lines in Fig. 2, and when in its operative position is horizontally disposed, as shown in Figs. 1 and 3. A shoulder 19 is formed on the operating lever and the same, when in operative position, engages the rear side of the particular roller which extends into the recess 16, then, as the lever is turned in a direction to set the brakes, indicated by the arrow in Fig. 3, the shaft and the roller carrier will move in unison with the casing, and when the lever is turned in the opposite direction the wall 20 of the body piece 5 will cause the engaging roller to move out of the path of the said shoulder and permit the casing to rotate independently of the shaft and the roller carrier, the face of each roller and the corner of the said wall being beveled, as shown in Fig. 3, to permit of such action.

It will, of course, be understood that my invention contemplates setting of the brakes through a number of partial revolutions of the brake shaft, that is to say, one stroke of the operating lever will impart a partial revolution to the brake shaft, the lever then being reversed for another stroke, the operation being repeated until the brakes are fully set, each partial revolution of the shaft being held against retrograde movement by the customary pawl and ratchet device secured to the car platform, but not shown.

It sometimes happens that when the brakes are set and the retaining pawl and ratchet mechanism released, the brake chain refuses to unwind because of some irregularity; in such cases it becomes necessary to use force to free the brake chain and allow the shaft to perform its proper function. To provide for such emergency and adapt my improved mechanism to performance of such reverse action I provide a device for locking the roller carrier to the body piece so that the whole structure will move in unison in either direction, the device, in the present instance, comprising a downwardly projecting boss 21 formed on the body piece 5 and having a chamber 22 communicating with the inside of the body piece together with a bore leading from the bottom of said chamber through and to the bottom of said boss. Within the chamber and the bore there is provided a movable rod having an enlarged portion 23, within the chamber, and a reduced portion 24 extending through and below the bore, the lower end of the rod being provided with a knob 25; then in the bottom of the roller carrier I provide a number of bores 26 adapted to receive the enlarged portion 23 of the movable rod which when pushed up into either of the bores 26 locks the parts together thereby providing a means whereby the operating lever can be utilized as a means for rotating the shaft in either direction.

While I have illustrated and described my invention in connection with brakes for railway cars it, obviously, is applicable for other winding purposes and I do not limit the use thereof to the particular purpose herein described.

Having thus fully described my invention, I claim:—

1. The combination with a shaft having a roller carrier thereon rotatable therewith, of a casing mounted on said shaft and rotatable independently thereof, an operating lever pivotally mounted on said casing, and roller mechanism carried by said carrier adapted to engage said lever and operatively connect the same with said shaft whereby the latter may be rotated.

2. The combination with a shaft having a roller carrier thereon rotatable therewith, of a casing mounted on said shaft and rotatable independently thereof, an operating lever pivotally mounted on said casing, and roller mechanism carried by said carrier adapted to engage said lever and automatically connect the same with said shaft whereby the latter may be rotated.

3. In a device of the character described, the combination of a shaft adapted to be rotated, a body piece mounted on the shaft and rotatable independently thereof, a roller carrier mounted on the shaft and rotatable therewith, said roller carrier having a plurality of inclined channels formed therein, rollers operative in said channels, an operating lever pivotally connected with said body piece, and means for engaging said lever with one of the said rollers whereby the shaft may be rotated.

4. In a device of the character described, the combination of a shaft adapted to be rotated, a body piece mounted on the shaft and rotatable independently thereof, a roller carrier mounted on the shaft and rotatable therewith, said roller carrier having a plurality of inclined channels formed therein, rollers operative in said channels, an operating lever pivotally connected with said body piece, and means for engaging said lever with one of the said rollers whereby the lever when turned in one direction will rotate the shaft and when turned in the opposite direction will move independently of the shaft.

5. In a device of the character described, a shaft adapted to be rotated, a casing mounted on the shaft and rotatable independently thereof, a roller carrier mounted on the shaft and rotatable therewith within the casing, said roller carrier having a plurality of inclined channels formed therein, rollers operative in said channels, an operating lever pivotally connected with said casing, said lever having means for engaging one of said rollers whereby the shaft may be rotated.

6. In a device of the character described, a shaft adapted to be rotated, a casing mounted on the shaft and rotatable independently thereof, a roller carrier mounted on the shaft and rotatable therewith within the casing, said roller carrier having a plurality of inclined channels formed therein, rollers operative in said channels, an operating lever pivotally connected with said casing, said lever having means for engaging one of said rollers whereby the lever when turned in one direction will rotate the shaft and when turned in the opposite direction will rotate the casing independently of the shaft.

7. In a device of the character described, a shaft adapted to be rotated, a casing mounted on the shaft and rotatable independently thereof, a roller carrier mounted on the shaft and rotatable therewith within the casing, said roller carrier having a plurality of inclined channels formed therein, rollers operative in said channels, an operating lever connected with said casing, said lever having means for engaging one of said rollers whereby the shaft may be rotated.

8. In a device of the character described, a shaft adapted to be rotated, a casing mounted on the shaft and rotatable independently thereof, a roller carrier mounted on the shaft and rotatable therewith within the casing, said roller carrier having a plurality of inclined channels formed therein, rollers operative in said channels, an operating lever connected with said casing, said lever having means for engaging one of said rollers whereby the lever when turned in one direction will rotate the shaft and when turned in the opposite direction will rotate the casing independently of the shaft.

9. In a device of the character described, a shaft adapted to be rotated, a casing mounted on the shaft and rotatable independently thereof, an operating lever pivotally mounted on the casing, a roller carrier mounted on the shaft and rotatable therewith within the casing, channels formed in said carrier, and loose rollers operative in said channels adapted to automatically engage the operating lever whereby the shaft may be rotated.

10. In a device of the character described, a shaft adapted to be rotated, a casing mounted on the shaft and rotatable independently thereof, an operating lever pivotally mounted on the casing, a roller carrier mounted on the shaft and rotatable therewith within the casing, channels formed in said carrier, and loose rollers operative in said channels adapted to engage the operating lever whereby the shaft may be rotated.

11. The combination of a shaft having a roller carrier thereon rotatable therewith, of a casing mounted on the shaft and rotatable independently thereof, an operating lever in pivotal connection with said casing and having an elevated operative position and a depending normal position, and roller mechanism arranged within the casing to engage said lever when elevated and thereby establish operative connection with the shaft to rotate the same, the said connection being broken by a downward movement of the lever.

12. The combination with a shaft having a roller carrier thereon, of a casing loosely mounted on the shaft, an operating lever carried by the casing and normally occupying a suspended position but movable in a vertical plane independently of said casing, and roller mechanism within the casing adapted to engage said lever and establish operative connection between the shaft and the lever when the latter is in operative position.

13. The combination with a shaft having a channeled roller carrier thereon, of a body piece having members extending laterally therefrom, an operating lever pivotally mounted on said members and normally suspended upon its pivot, and rollers carried by said carrier adapted to engage said lever and thereby establish operative connection with the shaft whereby the same may be rotated.

14. The combination with a shaft having a channeled roller carrier thereon, of a body having members extending laterally therefrom, an operating lever pivotally mounted on said members and normally suspended upon its pivot, and rollers carried by said carrier adapted to automatically engage said lever and thereby establish operative connection with the shaft whereby the same may be rotated.

15. The combination with a shaft having a roller carrier thereon rotatable therewith, of a casing mounted on the shaft and rotatable independently thereof, an operating lever pivotally mounted on said casing, roller mechanism carried by said carrier adapted to operatively connect said lever with said shaft, whereby the latter may be rotated in one direction, and means for locking said carrier and said casing together whereby the shaft may be rotated in either direction.

16. The combination with a shaft having a roller carrier thereon rotatable therewith, of a casing mounted on the shaft and rotatable independently thereof, an operating lever pivotally mounted on said casing, roller mechanism carried by said carrier adapted to operatively connect said lever with said shaft whereby the latter may be rotated in one direction and means carried by the casing adapted to engage the said carrier whereby these parts may be locked together and the shaft rotated in either direction.

17. The combination with a shaft having a roller carrier thereon rotatable therewith, of a casing mounted on the shaft, and rotatable independently thereof, an operating lever pivotally mounted on said casing, roller mechanism carried by said carrier adapted to operatively connect said lever with said shaft whereby the latter may be rotated in one direction, and a push-rod device carried by the casing adapted to engage the said carrier to lock the parts together, whereby the shaft may be rotated in either direction.

JOSEPH ECKERT.

Witnesses:
N. EMMONS, Jr.,
CLAIR R. ROLAND.

Copies of this patent may be obtained for five cents each, by addressing the "Commissioner of Patents, Washington, D. C."